(12) United States Patent
De Souza et al.

(10) Patent No.: US 12,287,644 B2
(45) Date of Patent: Apr. 29, 2025

(54) METHOD AND SYSTEM FOR IMPROVED AIRCRAFT TAKEOFF PERFORMANCE IN THE PRESENCE OF ASYMMETRIC THRUST CONDITIONS

(71) Applicant: Embraer S.A., São José dos Campos-SP (BR)

(72) Inventors: Sérgio Luiz Miranda De Souza, São José dos Campos-SP (BR); Flavio Pires Oliva, São José dos Campos-SP (BR); Edson Beraldo, Jr., São José dos Campos-SP (BR); Suzana Cândida Gomes De Oliveira, São José dos Campos-SP (BR)

(73) Assignee: Embraer S.A., São José dos Campos-SP (BR)

( * ) Notice: Subject to any disclaimer, the term of this patent is extended or adjusted under 35 U.S.C. 154(b) by 359 days.

(21) Appl. No.: 17/556,640

(22) Filed: Dec. 20, 2021

(65) Prior Publication Data

US 2023/0195142 A1 Jun. 22, 2023

(51) Int. Cl.
*G05D 1/00* (2024.01)
*B64C 13/28* (2006.01)
*B64D 45/00* (2006.01)
*B64C 13/04* (2006.01)

(52) U.S. Cl.
CPC .......... *G05D 1/0816* (2013.01); *B64C 13/28* (2013.01); *B64D 45/00* (2013.01); *B64C 13/044* (2018.01); *B64D 2045/0085* (2013.01)

(58) Field of Classification Search
CPC .... G05D 1/0816; B64C 13/28; B64C 13/044; B64C 13/16; B64C 13/04; B64C 13/503; B64D 45/00; B64D 2045/0085; B64D 31/10

See application file for complete search history.

(56) References Cited

U.S. PATENT DOCUMENTS

| 5,060,889 A | 10/1991 | Nadkarni et al. |
|---|---|---|
| 5,564,652 A | 10/1996 | Trimbath |
| 10,960,971 B1 * | 3/2021 | Hagerott .............. B64C 13/044 |

(Continued)

FOREIGN PATENT DOCUMENTS

GB 1560317 A 2/1980

OTHER PUBLICATIONS

Latimer, K., Ross, J. C-17 engine-out compensation system testing. In Aerospace Conference, 1999. Proceedings. 1999 IEEE, vol. 3, pp. 43-51.

(Continued)

*Primary Examiner* — Ig T An
*Assistant Examiner* — Christine Nguyen Huynh
(74) *Attorney, Agent, or Firm* — Nixon & Vanderhye P.C.

(57) ABSTRACT

In the event of a failed engine, an automatic takeoff thrust asymmetry compensation system ("ATACS") for an aircraft improves capabilities to reduce VMCG and deal with the potential side-effects simultaneously. The system commands selected control surfaces (which can be e.g., rudder and/or ailerons and/or spoilers or any combinations thereof) for a short period of time, improving the capability to reduce the VMCG without increasing the penalty on system failures or poor handling qualities.

24 Claims, 4 Drawing Sheets

(56) References Cited

U.S. PATENT DOCUMENTS

| | | | | |
|---|---|---|---|---|
| 2010/0102173 A1* | 4/2010 | Everett | ................ | B60T 8/1755 |
| | | | | 244/175 |
| 2015/0298797 A1* | 10/2015 | Friedel | .................... | B64C 13/16 |
| | | | | 244/92 |
| 2017/0008619 A1* | 1/2017 | Romana | ............... | G05D 1/0204 |
| 2019/0135411 A1* | 5/2019 | Gonzalez | ................ | B64C 27/54 |

OTHER PUBLICATIONS

Dodt, T. Boeing 787 Introduction presentation. Available at <http://www.ata-divisions.org/S_TD/pdf/other/IntroducingtheB-787.pdf> Accessed on: Sep. 14, 2018.

Favre, C. Fly-by-wire for commercial aircraft: the Airbus experience. International Journal of Control 59.1, 1994, pp. 139-157.

Extended European Search Report issued in European Application No. 22214334.9 dated Apr. 28, 2023.

* cited by examiner

METHOD AND SYSTEM FOR IMPROVED AIRCRAFT TAKEOFF PERFORMANCE IN THE PRESENCE OF ASYMMETRIC THRUST CONDITIONS

CROSS-REFERENCE TO RELATED APPLICATIONS

None.

STATEMENT REGARDING FEDERALLY SPONSORED RESEARCH OR DEVELOPMENT

None.

FIELD

The technology herein relates to aircraft control systems, more particularly to improved aircraft takeoff performance in the presence of asymmetric thrust conditions, and still more particularly to systems and methods for reducing minimum ground control speeds (VMCGs) of aircraft.

BACKGROUND

Aircraft engines are engineered to be highly reliable. Some published statistics state that gas turbine engines have dispatch rates of 99.89 to 99.89% percent, meaning that only 0.01 to 0.11% of flights could not depart due to an engine issue. Sometimes, the engine does not fail but is instead shut down as a precaution because the aircraft senses some deviation from normal engine parameters. But sometimes an aircraft gas turbine engine does fail.

A turbine engine failure occurs when the turbine engine unexpectedly stops producing thrust or power production due to a malfunction other than fuel exhaustion. This can occur due to a number of factors. Sometimes, the flight crew intentionally shuts down an engine because of a condition such as low oil pressure or a high oil temperature warning. In other, more dramatic situations, a compression surge disrupting the air flow through the engine can cause loud bangs and even flames to emanate from the engine. Such a compression surge can be caused by engine deterioration, crosswind over the engine's inlet, ice accumulation around the engine inlet, ingestion of foreign material such a bird strikes, an internal component failure such as a broken blade, or other factors.

A turbine-powered aircraft's takeoff procedure is designed around ensuring that an engine failure will not endanger flight. This is done by planning the takeoff around three critical "V speeds": V1, VR and V2:
- V1 is the so-called decision speed or "Go/No Go" speed, i.e., the speed at which stopping distance is no longer guaranteed in the event of a rejected takeoff (RTO). V1 is thus is the latest point in the takeoff roll where a stop can be initiated.
- VR, known as rotation speed, is the speed at which the nose of the aircraft rotates off the runway.
- V2 is the speed at which the airplane will climb in the event of a single engine failure. It is known as the takeoff safety speed.

The use of these critical speeds ensures that either there is sufficient thrust to continue the takeoff, or sufficient stopping distance to reject the takeoff will be available at all times. See e.g., Federal Aviation Administration, "Takeoff Safety Training Aid", available at https://www.faa.gov/other_visit/aviation_industry/airline_operators/training/media/takeoff_safety.pdf During the take-off run, with the engines at or near maximum power, upon failure of one of the engines, a tendency will be created for the aircraft to drift towards the failed engine. Because the failed engine is no longer delivering thrust, the thrust from a functioning engine on the other side of the engine is no longer balanced. The result of this unbalanced thrust is a turning moment or "yaw" of the aircraft, where the nose turns towards the failed engine. The pilot must then react and create a turning moment in the opposite direction in order to keep the aircraft on track down the runway.

To measure this kind of ground performance, there is another V speed referred to as "minimum ground control speed" or VMCG. The minimum ground control speed (VMCG) is the minimum speed during a takeoff nm in which the pilot is able to maintain a lateral deviation of the center of the runway less than 30 feet after the engine failure without the use of the nosewheel steering system (simulating a wet or contaminated runway). In other terms, VMCG is the calibrated airspeed during the takeoff run at which, when the critical engine is suddenly made inoperative, it is possible to maintain control of the airplane using the rudder control alone (without the use of nosewheel steering), as limited by 150 pounds of force, and using the lateral control to the extent of keeping the wings level to enable the takeoff to be safely continued. In the determination of VMCG, assuming that the path of the airplane accelerating with all engines operating is along the centerline of the runway, its path from the point at which the critical engine is made inoperative to the point at which recovery to a direction parallel to the centerline is completed may not deviate more than 30 feet laterally from the centerline at any point. See 14 CFR 23.149—Minimum control speed.

The technology herein focuses on functionalities to reduce such minimum ground control speeds (VMCG). An objective of aircraft manufacturers is to obtain low VMCG values that allow the achievement of good field performance. A lower VMCG means the airplane trajectory is corrected earlier, meaning it is better able to continue on a straight path down the runway upon engine failure.

Some in the past have employed automatic systems to detect engine failure and take corrective action during takeoff. These prior methodologies fall basically into two categories: automatic command rudder deflection upon engine failure detection; and linking additional control surfaces to manually operated control pedal.

For example, the Boeing C-17 Globemaster III aircraft has an engine failure compensation system during takeoff run. Through an engine failure recognition signal, the EOCS (Engine Outsourcing Compensation System) will command the rudder deflection. The higher the speed of the fault, the lower the commanded rudder deflection, with the half stroke of the total surface deflection as the maximum authority of the functionality.

The Boeing 777 aircraft also has an automatic rudder deflection system for traction asymmetry compensation coupled with an engine failure recognition signal, but this feature only comes into operation after lift-off. For the 787 aircraft, Boeing made the use of this functionality available during the takeoff run by adding inertial yaw detection to the logic.

Airbus A340 and A380 aircraft have a system to assist the pilot with traction asymmetry during the takeoff run, but using only the ailerons as a yaw generating surface, in the case of the A340, or associated with deflection of spoilers, the case of the A380. Both systems, aileron and/or spoilers, are linked to a pilot pedal control.

The turbo propeller aircraft C130J and A400M use a different premise to reduce the effect of traction asymmetry during the takeoff run. Upon recognition of the failure of one of the engines, the system will partially reduce the thrust produced by the opposite engine in order to reduce yaw.

A short explanation of and difficulties associated with each category are shown below:

1—Command Rudder Deflection Automatically Upon Engine Failure Detection

Short explanation: Here, the basic concept is to detect the engine failure and command a rudder deflection automatically in order to anticipate the pilot response.

Difficulties: A problem associated with this concept is to deal with system failures. As the rudder is commanded automatically, some failure scenarios emerge:

The rudder can be commanded inadvertently

The rudder can be commanded in the wrong direction.

Depending on the command amplitude, each scenario can lead to dangerous conditions. So, generally, the manufacturers are obligated to reduce the maximum commands amplitudes to reduce the effects of the failure scenarios, which also reduces the functionality effectiveness to reduce the VMCG. Such concerns about system failures are explained in PASCOE, K. Article about the Thrust Asymmetry Compensation of Boeing 777. Available at <www.flight.org/the-boeing-777-thrust-asymmetry-compensation-tac>.

2—Linking Additional Surfaces to Pedal

Short explanation: In this category, the basic concept is to link additional control surfaces (e.g., aileron and/or spoilers) to the pedal in order to improve the aircraft capability to generate yawing moment aerodynamically.

Difficulties: Problems associated with this approach include: 1) having aileron and/or spoilers deflected during lift-off (which may occur at high angles of attack), which can anticipate wing stall; and 2) dealing with roll tendencies during around to air transitions, which is difficult to predict because of the dependency with pilot behaviors.

Thus, while much work has been done in the past, further improvements are possible and desirable.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

Example non-limiting implementations herein present functionality that improves capabilities to reduce the VMCG and deal with the potential side-effects simultaneously.

Example non-limiting embodiments command the selected control surfaces (which can be e.g., rudder and/or ailerons and/or spoilers or any combinations thereof) for a short period of time, improving the capability to reduce the VMCG without increasing the penalty on system failures or poor handling qualities.

In this context, "short" is with respect to the time scale of aircraft takeoff and in one example embodiment, refers to an amount of time that is shorter than the amount of time the aircraft takes to reach rotation speed VR from some initial runway speed t0 greater than zero. In such contexts, "short" is on the order of pilot reaction time such as around 1 second.

The example non-limiting technology provides the following non-limiting features and advantages:

Maintaining the same level of failures criticality, the new functionality is able to reach or obtain large reductions in VMCG;

Maintaining the same level of VMCG reduction, the new functionality is subjected to failures with lower criticalities;

The new functionality is not subjected to difficulties associated with the "category two" functionalities described above (i.e., linking additional surfaces to pedal).

One example non-limiting implementation of an automatic takeoff thrust asymmetry compensation system ("ATACS") comprises or consists of an open loop functionality that provides automatic temporary surface deflection (pulse shaped command) in the case of the loss of one engine during the takeoff run. This strategy is effective at least in part because corrective action during the initial moments immediately after the engine failure occurs are exceptionally more effective to reduce aircraft deviations as it travels down the runway.

In example non-limiting embodiments, the control surfaces used can be any combination of rudder, ailerons, and spoilers.

In example non-limiting embodiments, for the ATACS functionality to be effective, the engine failure is detected very fast, such as within around 300 ms or less, and in any event substantially less than one second.

Example Airplane Implementing ATACS

Figure 1:
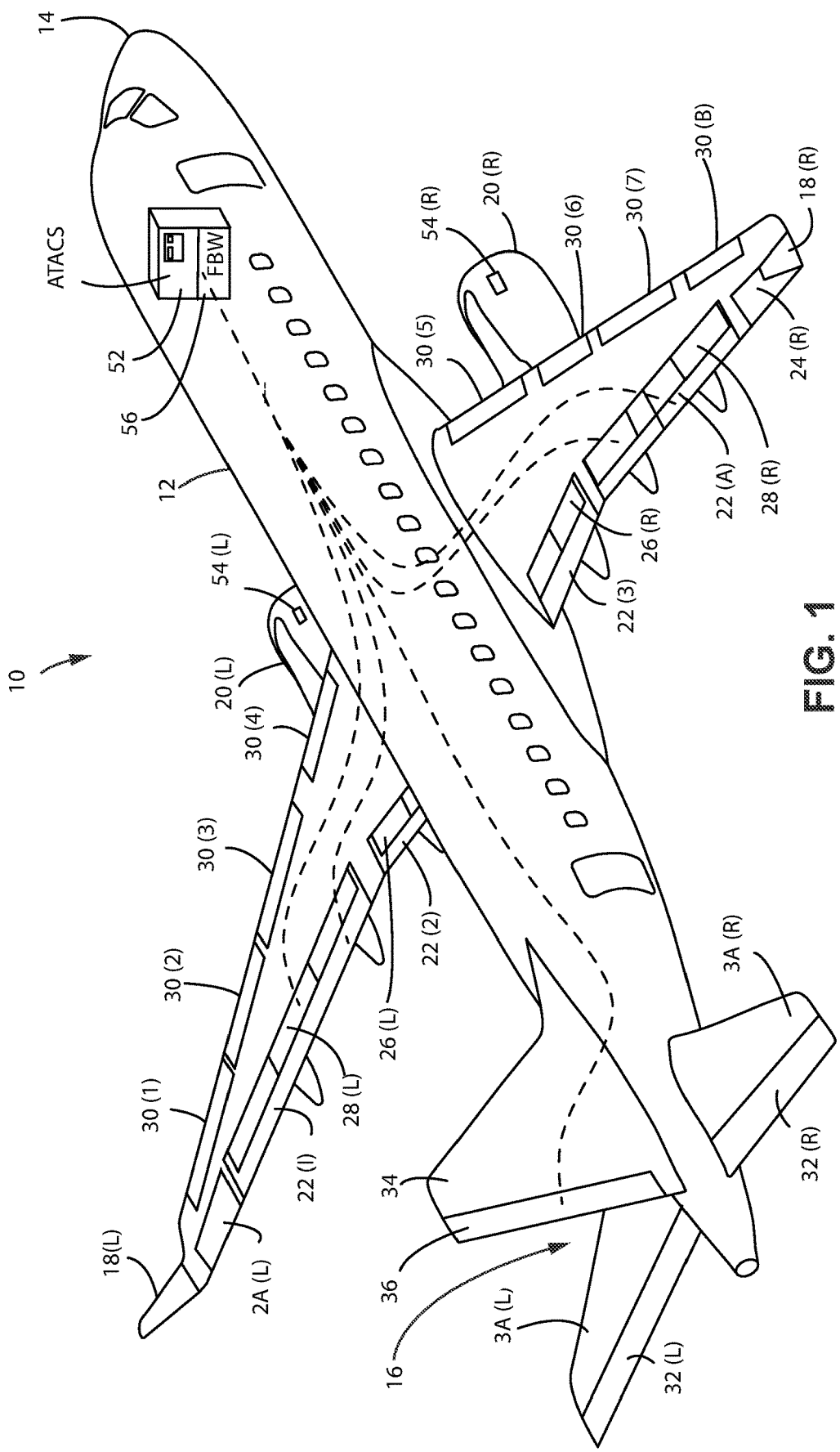
FIG. 1 shows an example aircraft.

FIG. 1 shows an example airplane 10 that can include or use an ATACS system. Airplane 10 includes a fuselage 12 having a nose 14, a tail 16 and wings 18L, 18R. In the example shown, a gas turbine engine 20(L) is mounted on the left wing 18L, and a second gas turbine engine 20(R) is mounted on the right wing 18R. Other embodiments could use two of more engines on each wing, internal combustion engines instead of gas turbine engines, etc.

As is well known, airplane 10 includes control surfaces used to control the attitude of the airplane during takeoff and flight, including:

flaps 22
ailerons 24
ground spoilers 26
multifunction spoilers 28
slats 30
elevators 32 (mounted on tail horizontal stabilizers 32)
rudder 36 (mounted on a tail vertical stabilizer 34).

Figure 1A:
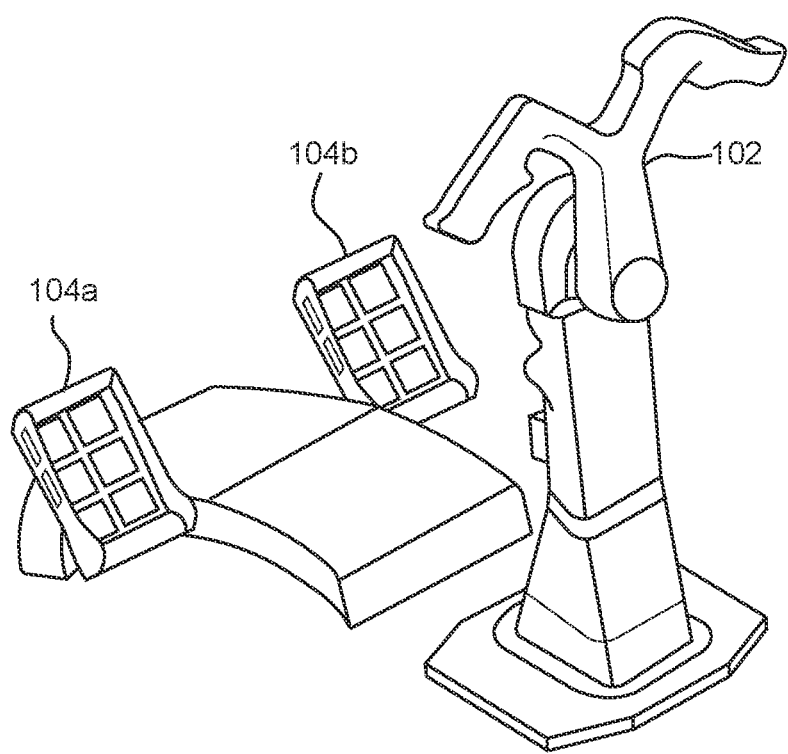
FIG. 1A shows example pilot control inputs.

As FIG. 1 shows, the positions and deflections of these various control surfaces are controlled by a fly-by-wire (FBW) system 50—an actuator based electronic and/or hydraulic control system that responds to pilot input via cockpit controls such as inceptor(s) 102, rudder pedals 104 and other input devices (as shown in FIG. 1A) and may also respond to control signals automatically generated by a flight control system 52. The flight control system 52 in turn may receive and process sensor signals such as engine failure sensors 54(L), 54(R) that detect engine failure. In the example non-limiting embodiment, flight control system 52 implements an ATACS (automatic takeoff thrust asymmetry compensation system) to automatically actuate one or more control surfaces (as described above) in response to detection of engine failure by engine failure sensors 54(L), 54(R).

Example Non-Limiting Rudder Implementation

In example non-limiting embodiments, when the ATACS command used is the rudder 36, a main objective of the ATACS is to anticipate the pilot command from rudder pedals 104 or other manual rudder control input. In example non-limiting embodiments, the pilot authority through rudder pedals 104 will still be available and it will be added to the ATACS command.

Figure 2:
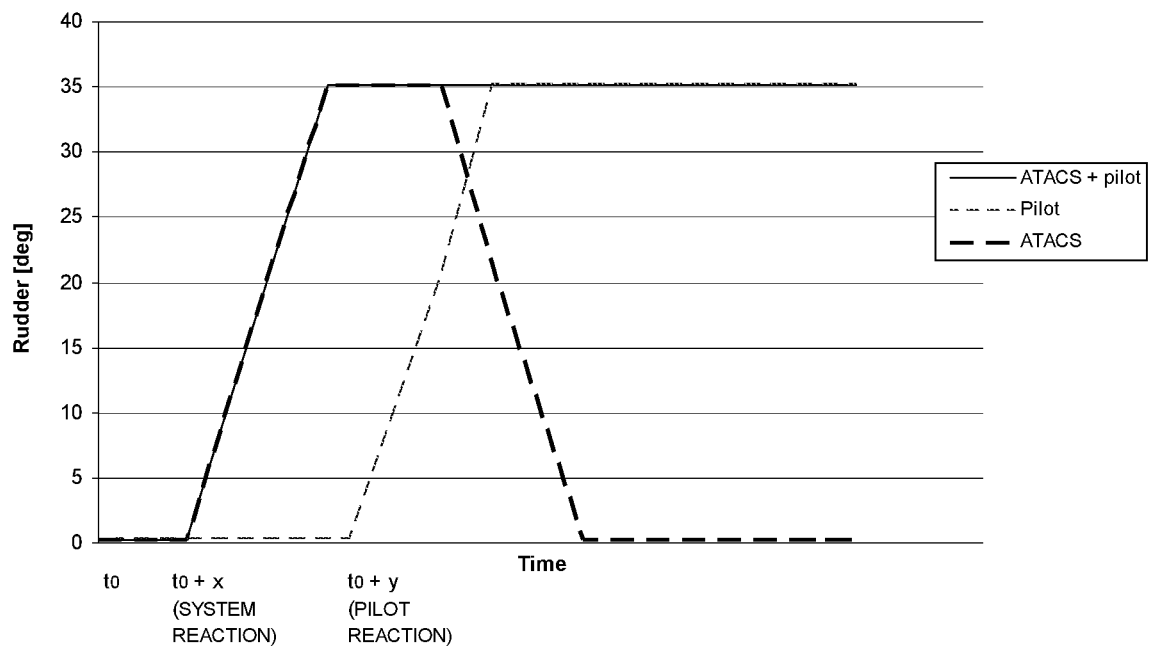
FIG. 2 shows an example rudder actuation profile and the system interaction with the pilot inputs.
Figure 2A:
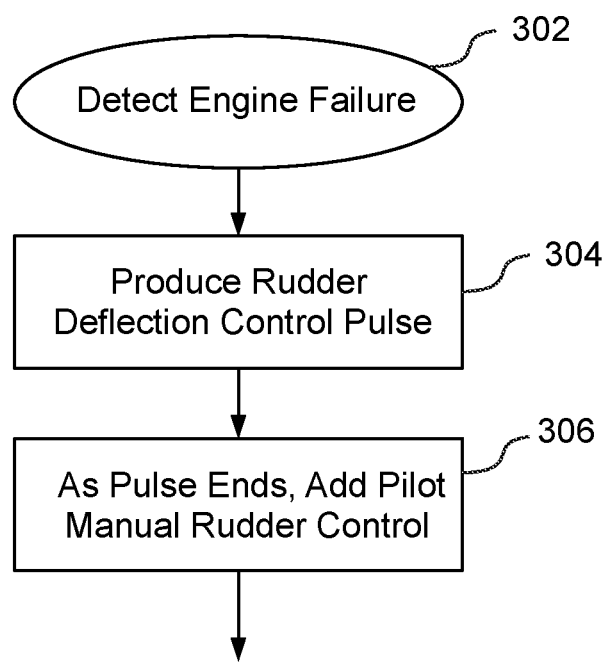
FIG. 2A shows an example ATACS rudder control flowchart.

When an engine failure signal has been detected by engine failure sensor 54 (see FIG. 2A block 302), the ATACS functionality triggers a temporary rudder deflection predefined in time and amount as exemplified in FIG. 2 (FIG. 2A, block 304).

FIG. 2 shows rudder deflection (in degrees) on the ordinate (vertical) axis and time on the abscissa (horizontal) axis. Along the time axis, three points in time are labelled:

t0=engine failure instant t0+x=engine failure recognition and functionality rudder command start (in example embodiments, x is desirably on the order of 300 ms or less)

t0+y=pilot reaction start (y may typically be on the order of about 1 second).

As can be seen in FIG. 2, no automatic rudder correction occurs at engine failure instant t0 because the ATACS system requires a finite time to detect the engine has failed and take corrective action in response to the detected failure. As can be seen in FIG. 2, as soon as the ATACS system detects engine failure (block 302 of FIG. 2A), it immediately produces a control pulse that begins to deviate the rudder in the appropriate direction (i.e., to impose a turning moment on the aircraft away from the side of the failed engine 54 and toward the side of the aircraft with all functional engine(s)) to compensate for turning moment created by the unbalanced engine thrust. The total amount of rudder 36 deviation may depend on the amount of engine thrust (or loss of engine thrust) being compensated for. In the example shown, the automatically controlled rudder 36 deviation increases rapidly and linearly from zero degrees to a maximum of e.g., 35 degrees (see dark dotted line).

The ATACS system produces a pulse such that the airplane maintains the maximum amount of rudder 36 deviation for only a very short time (i.e., on the order of the reaction time of a trained pilot) in example non-limiting embodiments, and then releases the rudder deviation to manual control by the pilot (FIG. 2A, block 306).

In the example shown, at time t0+y, the pilot reacts to the detected engine failure (e.g., in response to a warning horn, alert messages, etc.) by manually depressing a rudder pedal 104 with his or her foot. The foot pedal(s) are connected by the fly-by-wire (FBW) system 50 to the rudder 36 control surface attached to the vertical stabilizer 38 at the tail 16 of the aircraft 10 (see FIG. 1). The further the pilot depresses the rudder pedal 104, the further the rudder 36 deflects (and which pedal the pilot depresses will determine the direction of rudder deflection). However, as shown in FIG. 2, the ATACS system has already automatically deflected the rudder 36 in the appropriate direction to correct for the loss of thrust from the failed engine 54 long before the pilot is able to react to the engine failure.

In the example non-limiting embodiment, the ATACS system begins deviating the rudder 36 back to its neutral position at some time instant soon after the pilot has time to react (or is detected to have reacted) by manually depressing the rudder control pedal 104. In one embodiment, the length of the rudder control pulse is predetermined and fixed. In another embodiment, the length of the rudder control pulse depends on sensed input activity from the rudder pedal 103, i.e, the control pulse terminates as soon as the pilot depresses the pedal. The ATACS system thus allows rudder control to be gracefully and seamlessly transitioned from automatic ATACS control to manual pilot control once the pilot has reacted to the failed engine, giving the pilot the authority to manually control rudder 36 deflection as soon as the pilot is capable of manually taking (or has manually taken) over rudder control.

During a transition period between automatic and manual rudder control, the rudder 36 deflection is controlled by a combination of ATACS automatic control and pilot manual control, with the two controls being additive to retain the rudder 36 in a predetermined maximum deflection (e.g., 35 degrees) for the particular conditions until the pilot has a chance to assume full manual control over the rudder. Thus, through manual input, the pilot can extend or prolong the rudder deviation control that was initiated by the ATACS system.

FIG. 2 shows the rudder command provided by the ATACS functionality (dark dashed line), by the pilot (light dashed line) and the addition of both (solid line). In the example shown, the pilot has continued the same 35 degree rudder deflection that the ATACS system automatically initiated, but in other scenarios the pilot may manually further increase or decrease rudder deflection amount once the ATACS control pulse has ended and the system releases the rudder 36 to manual control by the pilot.

As discussed above, the aeronautical industry already uses rudder commands based on engine failure detection to reduce VMCG. However, example non-limiting embodiments herein provide a rudder command that is temporary (e.g., a pulse shaped command) and will automatically terminate when the pilot has had time to react to the engine failure (or in some embodiments, when the pilot has in fact reacted to the engine failure).

Example Non-Limiting Aileron or Spoiler Implementation

When the command used is the ailerons 24 or spoilers 26, the main objective of the ATACS in example non-limiting embodiments is to assure that the temporary command generated by ATACS will be applied before the aircraft lift-off. The surface command time span can be dimensioned to reduce drastically the chances of the aircraft to get airborne before the end of surface pulse command.

Figure 3:
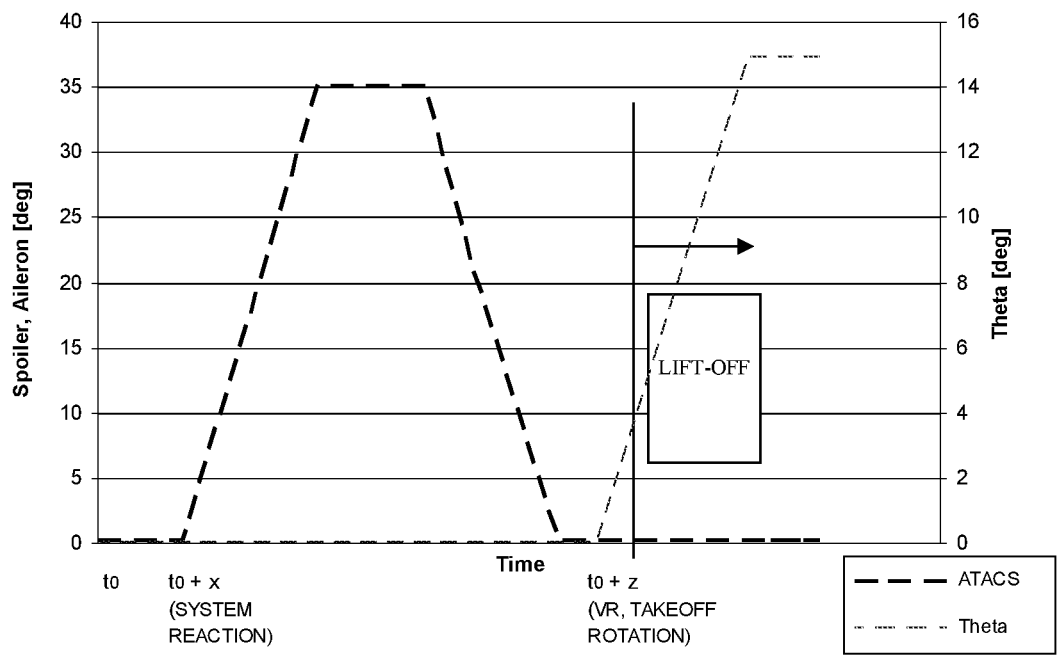
FIG. 3 shows an example aileron/spoiler actuation profile and takeoff schedule.
Figure 3A:
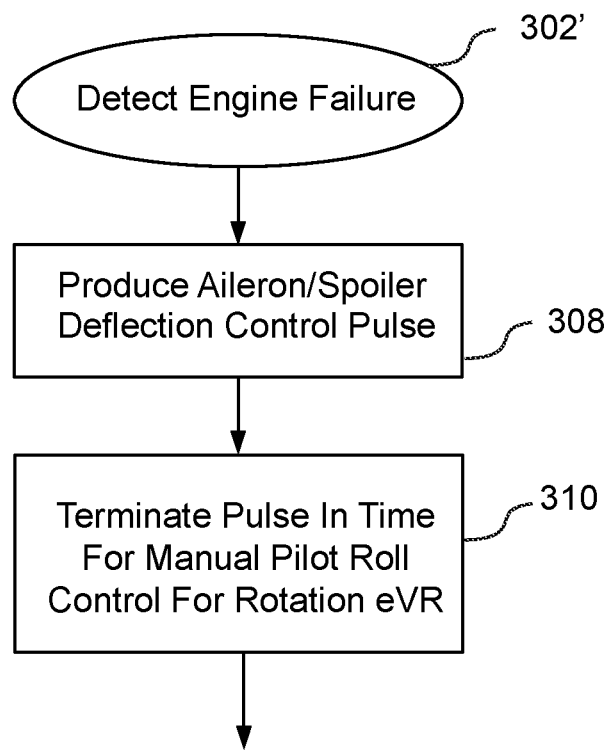
FIG. 3A shows an example ATACS aileron/spoiler control flowchart.

FIG. 3 shows one non-limiting example of a good system design where, in an engine 20 failure event (FIG. 3A block 302'), the pulse-shaped command is generated in response (Block 308) finishes before the aircraft lift-off (block 310). In this case as in FIG. 2, FIG. 3 shows control surface (e.g., ailerons 24 and/or spoilers 26) deflection (angle theta in degrees) on the ordinate (vertical) axis and time on the abscissa (horizontal) axis. Along the time axis, three points in time are labelled:

t0=engine failure instant t0+x=engine failure recognition and functionality aileron/spoiler command start t0+z=pilot starts the takeoff rotation FIG. 3 also shows the aircraft pitch attitude (light dashed line) describing the region where the lift-off is likely to occur (somewhere between the takeoff rotation and the achievement of theta target). In FIG. 3, the ATACS system automatically controls the ailerons 24 and/or spoilers 28 to begin deflecting as soon as engine 20 failure has been detected via sensors 54. As can be seen, ATACS controls the FBW system 50 to deflect the ailerons 24 and/or spoilers 28 beginning immediately upon detection of engine failure (dark dotted line). Such control surface deflection selects the appropriate aileron 24 and/or spoiler 28 on the appropriate wing 18 to correct for the loss of thrust from the engine 20 that has failed (typically this would involve deflecting a control surface(s) on the wing of the engine that has not failed in order to introduce drag on that side of the airplane 10 to introduce a turning moment that will counteract the turning moment resulting from the unbalanced thrust due to engine failure).

The ATACS system soon automatically achieves a maximum predetermined deflection (in this case 35 degrees as one non-limiting example). In the example shown, the ATACS system maintains such predetermined deflection for a certain amount of time, but then begins actuating the control surface(s) 24, 28 back to their neutral position(s) so that the control surface(s) will reach their neutral positions before aircraft rotation and lift-off. In other words, ATACS temporarily uses the ailerons 24 and/or spoilers 28 to correct for the failed engine 20 while the airplane 10 is rolling down the runway, but then releases control of the ailerons 24 and/or spoilers 26 sufficiently in advance of when the pilot will or may begin manually controlling rolling or banking of airplane beginning shortly before, at or after rotation at VR by manually controlling the ailerons 24 and/or spoilers 28 e.g., using the inceptor 102 and spoiler control levers (not shown).

The aeronautical industry uses aileron/spoiler commands based on a strategy to link those surfaces to the pedals, which brings the concerns about anticipating wing stall and the possible roll tendencies during ground to air transition. Example non-limiting embodiments herein use a temporary command (e.g., pulse shaped), and automatic spoiler/aileron surface deflection is not associated with the pedal, inceptor or other pilot commands.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An automatic aircraft control system for automatically temporarily deflecting at least one control surface of an aircraft while the aircraft is on the ground during rollout of the aircraft, comprising:
at least one sensor configured to sense at least one engine parameter and to detect engine failure based on the sensed at least one engine parameter;
at least one processor coupled to the at least one sensor, the at least one processor being configured to produce a short control pulse in response to the sensor detecting engine failure, the short control pulse having a duration lasting two seconds or less and configured to exercise open loop control over at least one actuator; and
the at least one actuator connected to receive the short control pulse, the at least one actuator actuating the at least one control surface in response to the short control pulse to thereby automatically temporarily deflect the at least one control surface and thereby induce a turning moment on the aircraft to compensate for a turning moment created by unbalanced engine thrust caused by the engine failure while the aircraft is on the ground during rollout;
the at least one processor being further configured to release automatic deflection of the control surface after the duration of the short control pulse.

2. The system of claim 1 wherein the control surface comprises a rudder.

3. The system of claim 1 wherein the control surface comprises a spoiler.

4. The system of claim 3 wherein the at least one processor generating the short control pulse is not associated with a pedal, inceptor or other pilot commands, and is further configured to release control of the at least one control surface to the pedal, inceptor or other pilot commands after the duration of the short control pulse.

5. The system of claim 1 wherein the control surface comprises an aileron.

6. The system of claim 5 wherein the at least one processor generating the short control pulse is not associated with a pedal, inceptor or other pilot commands, and is further configured to release control of the at least one control surface to the pedal, inceptor or other pilot commands after the duration of the short control pulse.

7. The system of claim 1 wherein the at least one processor is further configured to terminate the short control pulse before takeoff rotation.

8. The system of claim 1 further including a pilot input device, and wherein the at least one processor adds manual control based on the pilot input device to the automatic control in generating the short control pulse.

9. The system of claim 1 wherein the at least one processor is further configured to permit manual control of the at least one control surface as once the short control pulse ends.

10. The system of claim 1 wherein the short control pulse lasts on the order of trained pilot reaction time to the failed engine.

11. The system of claim 1 wherein the at least one processor is further configured to thereafter give a pilot authority to actuate the at least one control surface once the short control pulse ends.

12. The system of claim 1 wherein the at least one processor is further configured to detect engine failure within 300 milliseconds or less.

13. An automatic aircraft control method comprising:
detecting engine failure of an aircraft's engine based on at least one sensed engine parameter while the aircraft is on the ground during rollout of the aircraft;
producing a short control pulse in response to detecting engine failure, the short control pulse lasting two seconds or less and configured to exercise open loop control of at least one control surface;
automatically actuating the at least one control surface in response to the short control pulse thereby automatically temporarily deflecting the at least one control surface to induce a turning moment on the aircraft to compensate for a turning moment created by unbalanced engine thrust caused by the engine failure during rollout while the aircraft is on the ground; and
releasing automatic control of the control surface once the short control pulse ends.

14. The method of claim 13 wherein the control surface comprises a rudder.

15. The method of claim 13 wherein the control surface comprises a spoiler.

16. The method of claim 15 wherein generating the short control pulse is not associated with a pedal, inceptor or other pilot commands.

17. The method of claim 13 wherein the control surface comprises an aileron.

18. The method of claim 15 wherein generating the short control pulse is not associated with a pedal, inceptor or other pilot commands.

19. The method of claim 13 further including terminating the short control pulse while the aircraft is on the ground before takeoff rotation and releasing control of the at least one control surface to a pilot.

20. The method of claim 13 further including adding manual control based on a pilot input device to automatic control in generating the short control pulse.

21. The method of claim 13 further including adding manual control as the short control pulse ends.

22. The method of claim 13 wherein the short control pulse lasts on the order of trained pilot reaction time to the failed engine.

23. The method of claim 13 further comprising giving a pilot authority to actuate the at least one control surface once the short control pulse ends.

24. The method of claim 13 wherein detecting engine failure is performed within 300 milliseconds or less.

\* \* \* \* \*